(12) United States Patent
Uchida

(10) Patent No.: US 9,164,707 B2
(45) Date of Patent: Oct. 20, 2015

(54) SERVER SYSTEM, METHOD FOR CONTROLLING SERVER SYSTEM, AND STORAGE MEDIUM

(71) Applicant: CANON KABUSHIKI KAISHA, Tokyo (JP)

(72) Inventor: Takayuki Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/604,527

(22) Filed: Jan. 23, 2015

(65) Prior Publication Data

US 2015/0212765 A1     Jul. 30, 2015

(30) Foreign Application Priority Data

Jan. 27, 2014   (JP) ................................. 2014-012801

(51) Int. Cl.
| | | |
|---|---|---|
| G06F 15/00 | (2006.01) | |
| G06F 3/12 | (2006.01) | |
| G06K 1/00 | (2006.01) | |

(52) U.S. Cl.
CPC ............ G06F 3/1208 (2013.01); G06F 3/1256 (2013.01)

(58) Field of Classification Search
CPC .............................. G06F 3/1208; G06F 3/1256
USPC ....................................... 358/1.15, 1.14, 1.13
See application file for complete search history.

(56) References Cited

U.S. PATENT DOCUMENTS

2012/0290387 A1* 11/2012 Davis .......................... 705/14.49
2013/0047087 A1*  2/2013 Yamahara et al. ............. 715/727

FOREIGN PATENT DOCUMENTS

JP          2003-015837 A       1/2003

* cited by examiner

*Primary Examiner* — Douglas Tran
(74) *Attorney, Agent, or Firm* — Canon USA, Inc. IP Division

(57) ABSTRACT

A server system includes a determination unit, a setting unit, a transmission unit, and a service for performing predetermined processing on data from an external server, wherein the service provides a client with a function of displaying a data preview. The determination unit determines a data type to be subjected to the predetermined processing. The setting unit sets, where it is determined, based on the determined data type, that the client can preview the data, a URL of a specific save location in the server system, and sets, where it is determined, based on the determined data type, that the client cannot preview the data, a URL that allows a data preview and includes an external server URL. The transmission unit transmits, to the client, a data operation screen on which the URL has been set for a preview instruction unit that can receive an instruction to preview the data.

10 Claims, 18 Drawing Sheets

FIG.15A

```
     1502
1501  (   1503      1504     1505
 (    (    (         (        (
SELECT Id, Title, FileType, ContentSize FROM ContentVersion
```

FIG.15B

```
1505   1506           1507                    1508
 (      (              (                       (
SELECT Id, VersionData FROM ContentVersion WHERE Id = 'Id'
```

FIG.15C

```
SELECT Id, VersionData FROM ContentVersion WHERE Id = 12345
```

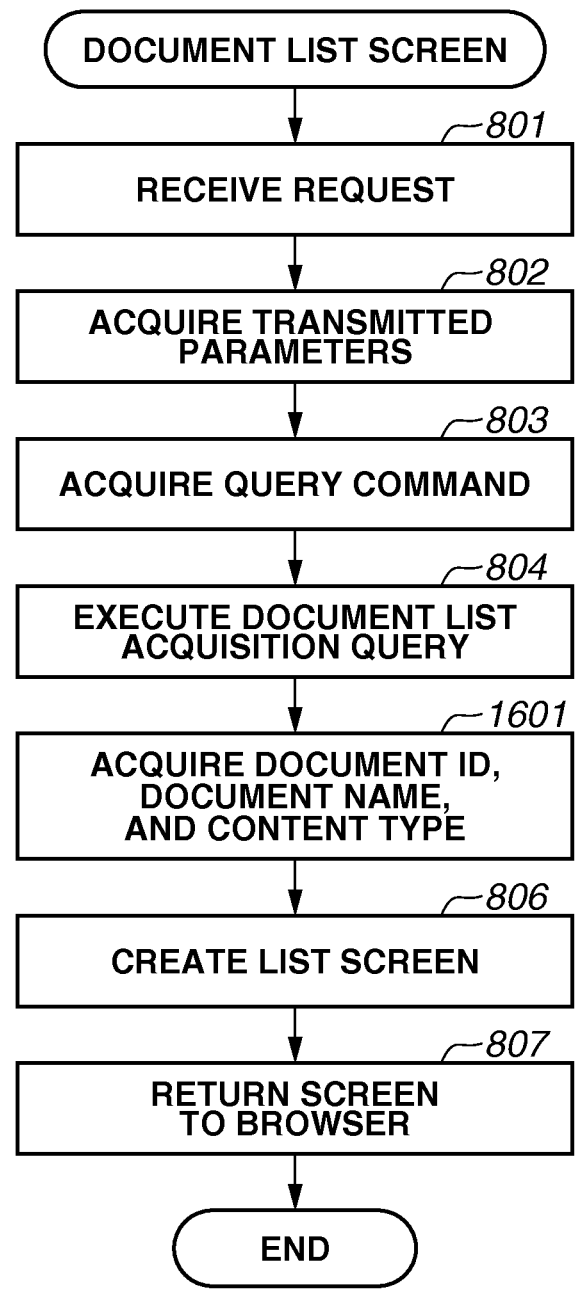

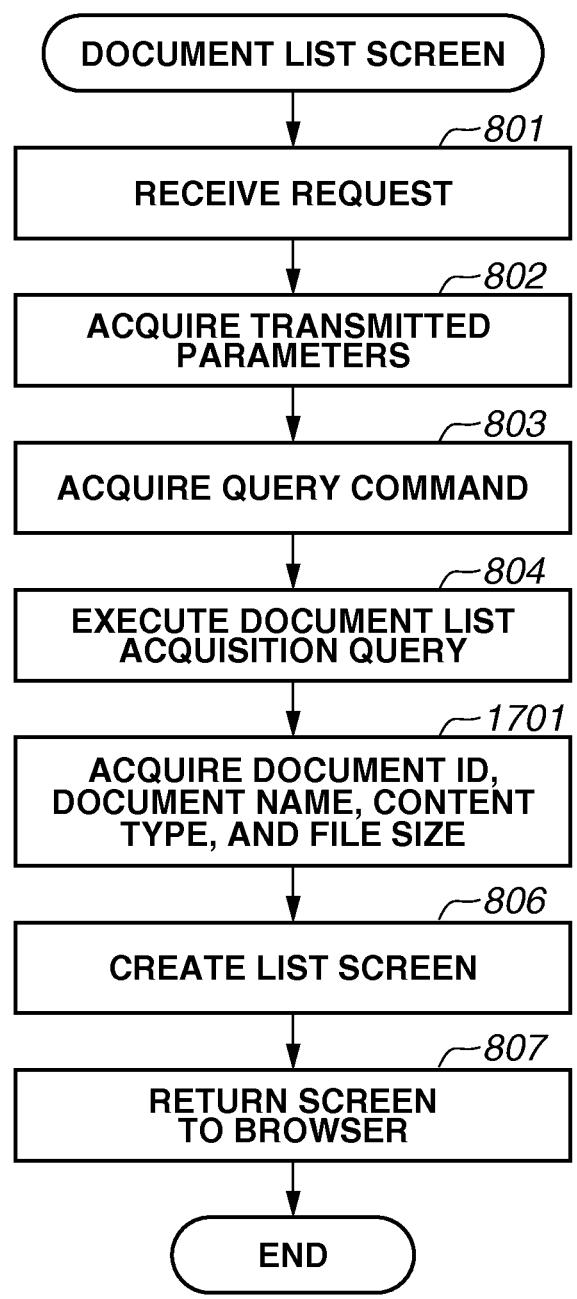

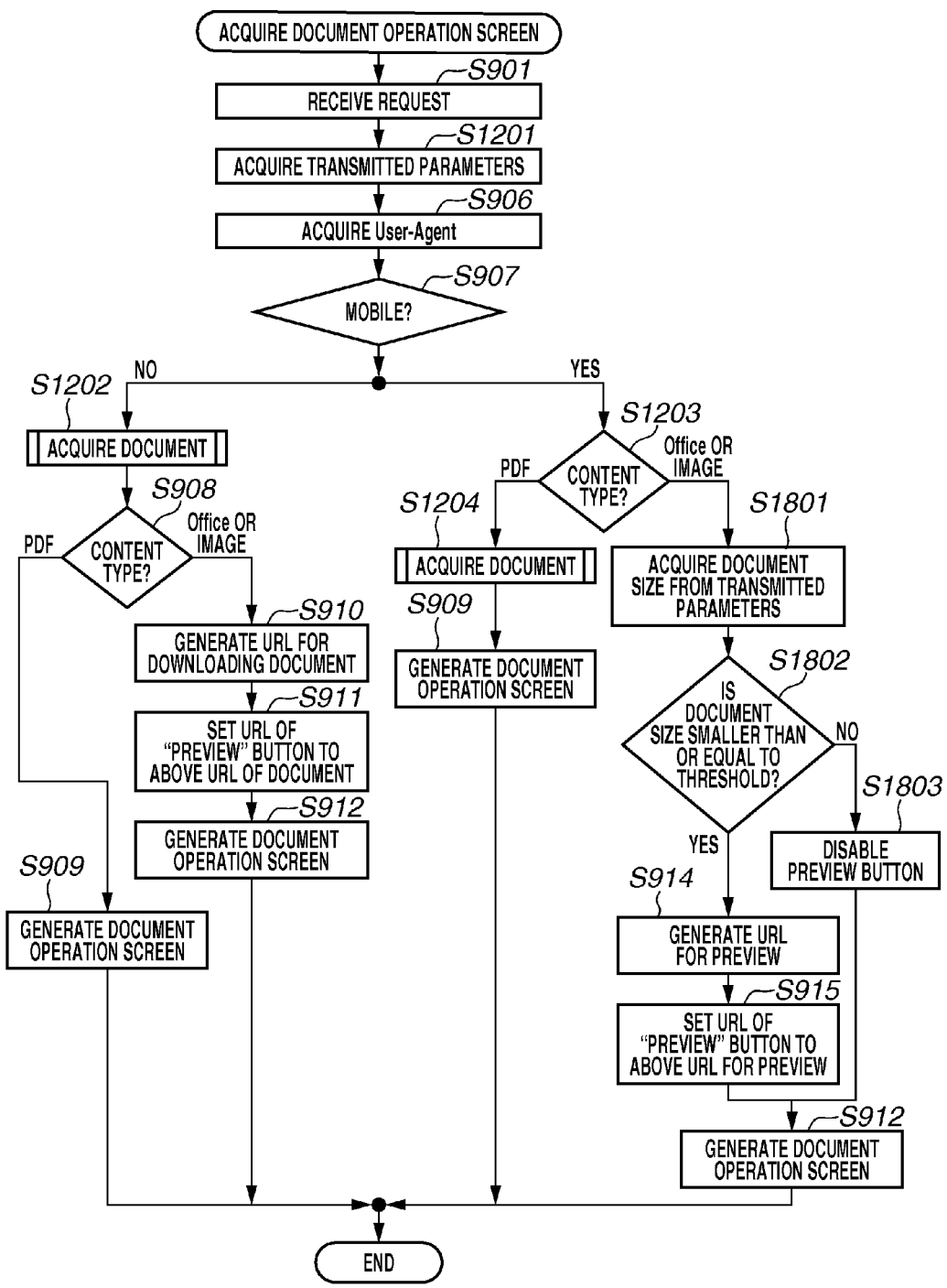

SERVER SYSTEM, METHOD FOR CONTROLLING SERVER SYSTEM, AND STORAGE MEDIUM

BACKGROUND OF THE INVENTION

1. Field of the Invention

The present invention relates to a server system for acquiring a document saved in a cloud, a method for controlling a server system, and a storage medium.

2. Description of the Related Art

A form of managing business data and documents and performing various types of processing in a cloud platform is beginning to be prevalent. A representative example of the cloud platform is Salesforce CRM® from salesforce.com, Inc. A user accesses a web page in a cloud platform via the Internet through a browser on a client computer. If a user gives an instruction to print a document through the web page, the browser is redirected to a document generation server, and the user selects a document to be printed, on a screen returned from the document generation server. Then, the document generation server acquires the document in the cloud platform and transmits the document to the document generation server. The user can confirm (preview) the content of the document before actually giving an instruction to print the document. The de facto standard of a document format handled in the cloud is Portable Document Format (PDF). To preview a PDF document, the user needs to give an instruction to display a preview of the PDF document, on a screen returned from the document generation server. The document generation server downloads the PDF document to the browser on the client computer, and a PDF viewer application installed in the client computer displays a preview of the PDF document.

Additionally, documents other than a PDF document can also be saved in the cloud platform. There is a demand for printing such documents. Examples of the documents that can be saved in the cloud platform include Office documents such as a Microsoft® Word document and a PowerPoint® document and image documents such as a Joint Photographic Experts Group (JPEG) document and a Portable Network Graphics (PNG) document.

A conventional cloud platform provides a preview display function for displaying a preview of the content of a saved document on a browser. For example, if a browser has accessed a web page in the cloud platform in which Microsoft® Word documents or PowerPoint® documents are saved, the document is displayed on the browser so that the document can be previewed. At this time, the document automatically converted by the cloud platform into a format that can be previewed on the browser, such as the Flash format or the PNG format, is displayed.

Meanwhile, mobile terminals such as tablets and smartphones represented by iPad®, iPhone®, and Android® have been rapidly prevalent. A user increasingly accesses a cloud platform using a mobile environment and prints a document. To preview an Office document, an Office application needs to have been installed in the client environment. An Office application, however, has not necessarily been installed particularly in a mobile environment. In response, Japanese Patent Application Laid-Open No. 2003-015837 discusses a conventional method for displaying a document so that the document can be previewed regardless of the client environment. Japanese Patent Application Laid-Open No. 2003-015837 discusses a technique for converting a document into a predetermined format (an image file) and then displaying the document on a browser.

SUMMARY OF THE INVENTION

The conventional method, however, has the following problem. That is, every time a request to preview a document is received, the document needs to be converted into the predetermined format. Thus, if a plurality of preview requests is simultaneously received, the load of a document generation server increases.

The present invention is directed to a technique capable of, in a system for printing a document saved in a cloud, allowing a preview of the document on a browser without a document generation server converting the document, regardless of the environment of a client.

According to an aspect of the present invention, a server system having a service for performing predetermined processing on data acquired from an external server, wherein the service provides a client with a function of displaying a preview of the data as a function in the service, the server system comprising: a determination unit configured to determine a type of the data to be subjected to the predetermined processing by the service, a setting unit configured to set, in a case where it is determined, based on the type of the data determined by the determination unit, that the client can preview the data, a uniform resource locator (URL) of a specific save location in the server system in which the data acquired from the external server is saved, and configured to set, in a case where it is determined, based on the type of the data determined by the determination unit, that the client cannot preview the data, a URL that allows a preview of the data and includes a URL of the external server, and a transmission unit configured to transmit, to the client, a data operation screen on which the URL has been set by the setting unit for a preview instruction unit that can receive an instruction to preview the data.

According to the present invention, it is possible to, in a system for printing a document saved in a cloud, allow a preview of the document on a browser without a document generation server converting the document, regardless of the environment of a client.

Further features of the present invention will become apparent from the following description of exemplary embodiments with reference to the attached drawings.

BRIEF DESCRIPTION OF THE DRAWINGS

FIGS. 15A, 15B, and 15C are examples of query commands registered in a query information record.

FIG. 16 is a flow chart illustrating a document list screen creation process according to the second exemplary embodiment.

FIG. 17 is a flow chart illustrating a document list screen creation process according to a third exemplary embodiment.

FIG. 18 is a flow chart illustrating a document operation screen creation process according to the third exemplary embodiment.

DESCRIPTION OF THE EMBODIMENTS

Various exemplary embodiments, features, and aspects of the invention will be described in detail below with reference to the drawings.

Figure 1:
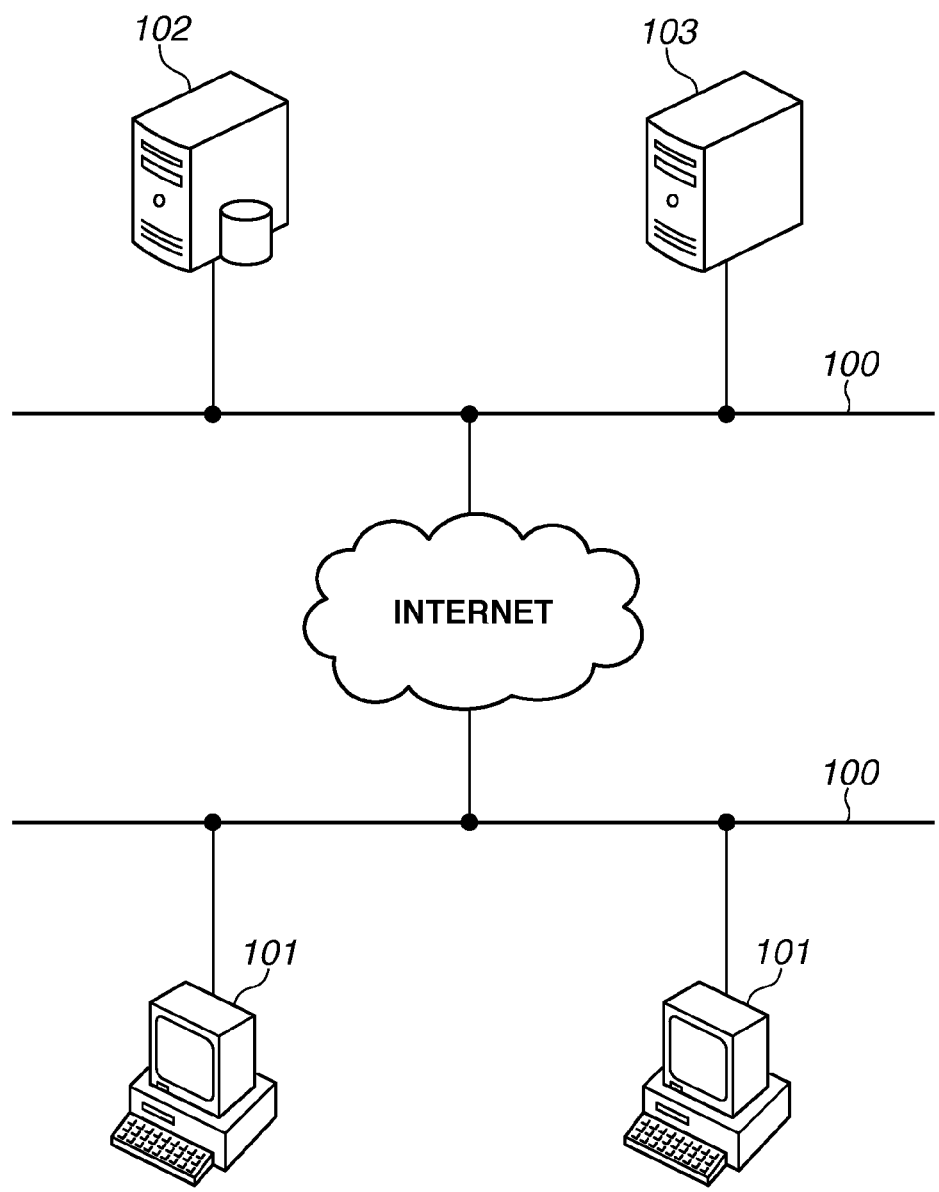
FIG. 1 is a diagram illustrating a system configuration.

FIG. 1 is a diagram illustrating a system configuration according to a first exemplary embodiment of the present invention. Each of client apparatuses 101 issues a request to a cloud platform server 102 and a document generation server 103. The cloud platform server 102 displays or transmits a document held by the cloud platform server 102, in response to a request from the client apparatus 101 or the document generation server 103. The document generation server 103 receives a request from the client apparatus 101 and acquires a document list or a document from the cloud platform server 102 or transmits a document to a document generation server (not illustrated).

Further, the above components are connected to one another via a network 100 so that the components can communicate with one another. The network 100 is a communication network such as the Internet including, for example, a local area network (LAN), a wide area network (WAN), a telephone circuit, a dedicated digital circuit, an Asynchronous Transfer Mode (ATM) or frame relay circuit, a cable television circuit, and a data broadcasting wireless circuit, and combinations thereof. The network 100 may only need to allow the transmission and reception of data. The method of communication from the client apparatus 101 to the cloud platform server 102 or the document generation server 103, the method of communication from the document generation server 103 to the cloud platform server 102, and the method of communication between the servers may be different from one another. FIG. 1 illustrates each apparatus as a single apparatus. Alternatively, each apparatus may include a plurality of apparatuses. Further, it is suitable that each of the cloud platform server 102 and the document generation server 103 should be a cloud system that includes a plurality of servers and disperses requests through a load balancer. Alternatively, each of the cloud platform server 102 and the document generation server 103 may be a single server. Thus, the term "server system" includes both a single server and a server group including a plurality of servers.

Figure 2:
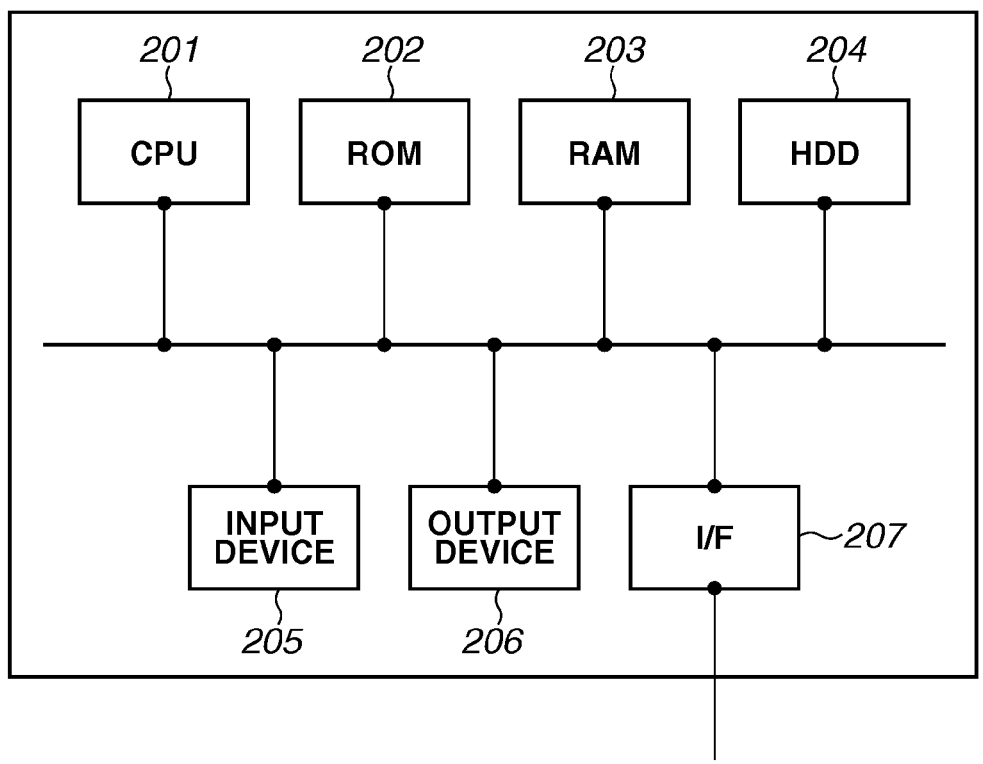
FIG. 2 is a block diagram illustrating a hardware configuration.

FIG. 2 is a block diagram illustrating a hardware configuration of each of the client apparatuses 101, the cloud platform server 102, and the document generation server 103 in FIG. 1. A central processing unit (CPU) 201 directly or indirectly controls devices (a read-only memory (ROM) 202, and a random-access memory (RAM) 203, and the like) connected to the CPU 201 via an internal bus, and executes a program for achieving the present invention. The ROM 202 stores the Basic Input/Output System (BIOS). The RAM (direct storage device) 203 is used as a work area for the CPU 201 or is used as a temporary storage for loading software modules for achieving the present invention. An indirect storage device 204, such as a hard disk drive (HDD) or a solid-state drive (SSD), stores an operating system (OS) as basic software and software modules and serves also as a storage area for saving data in a specific save location in the server system. An input device 205 is a keyboard or a pointing device (not illustrated). An output device 206 is connected to a display. An interface (I/F) 207 is used to connect to the network 100.

In these pieces of hardware, after starting, the CPU 201 executes the BIOS to load the OS from the HDD 204 into the RAM 203 so that the OS can be executed. The CPU 201 loads various software modules from the HDD 204 into the RAM 203 as needed according to the operation of the OS so that the various software modules can be executed. The various software modules are executed by the CPU 201 through the cooperation of the above devices, thereby operating. Further, the I/F 207 is connected to the network 100 and is controlled by the CPU 201 according to the operation of the OS, thereby achieving communication by the above communication method.

Figure 3:
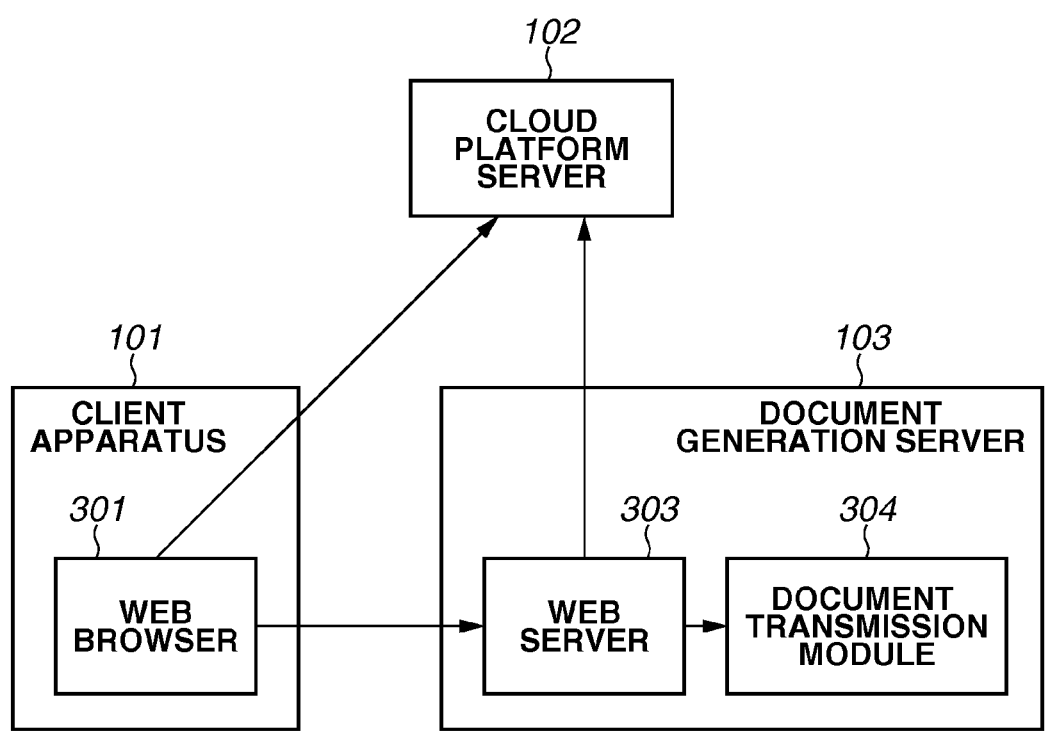
FIG. 3 is a block diagram illustrating an overall configuration of a document printing system.

FIG. 3 is a block diagram illustrating an overall configuration of a document printing system according to the present exemplary embodiment. The client apparatus 101 includes a web browser 301 as a user interface application. The cloud platform server 102 has the function of managing a user who uses a service, managing a document, and managing settings for redirecting to the document generation server 103. Additionally, the cloud platform server 102 provides a preview display function for displaying a preview of the content of a saved document on a browser. Further, the cloud platform server 102 is supposed to be used by a plurality of companies or organizations (this is generally called "multitenancy"). The user management and the document management described above are performed for each company or organization that uses the cloud platform server 102.

Figure 4:
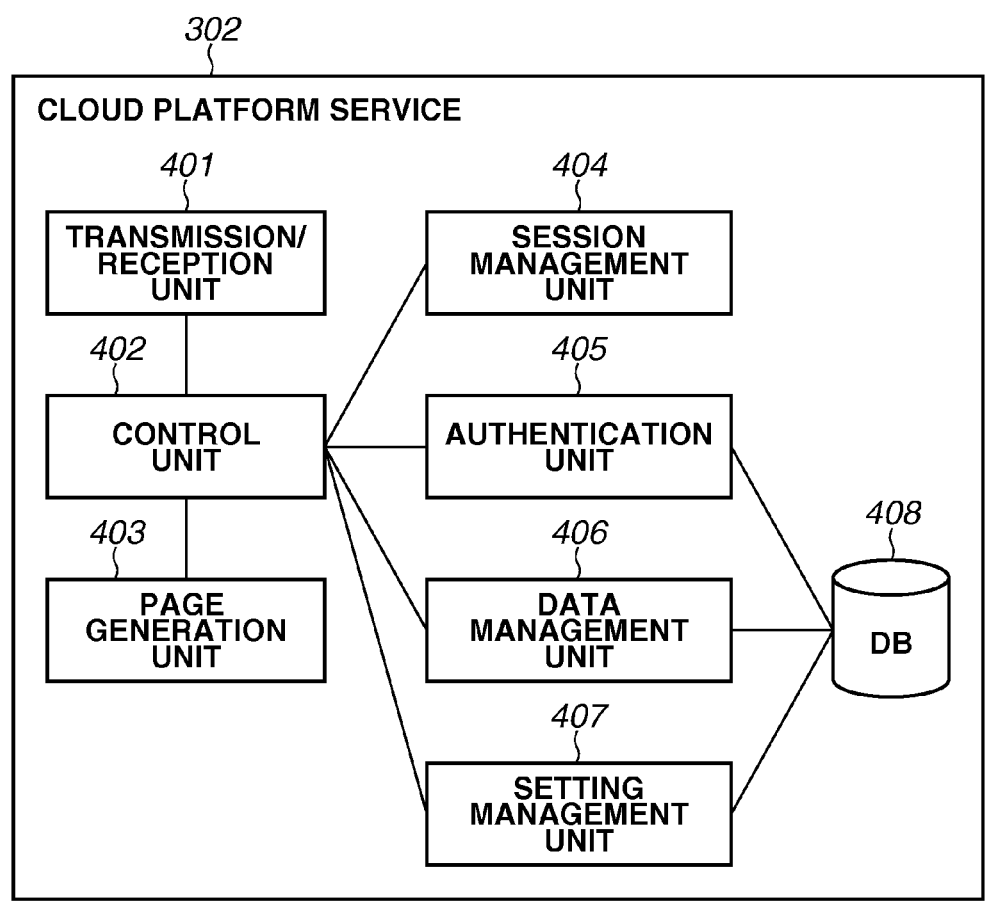
FIG. 4 is a block diagram illustrating a configuration of software modules of a cloud platform service.

The document generation server 103 has a service for performing predetermined processing on data acquired from the cloud platform server 102 (illustrated in FIG. 4). The document generation server 103 includes a web server 303 and a document transmission module 304. The web server 303 is configured to have a so-called web application function and can be accessed by the client 101 through the web browser 301. The web server 303 replies to a request from the web browser 301 with user interface information. The web browser 301 renders and displays the user interface information obtained from the web server 303. The displayed user interface information includes, for example, a list of documents to be acquired from the cloud platform server 102 by the document generation server 103 and an interface for requesting a document. Further, if the web server 303 has received a document acquisition request from the web browser 301, the web server 303 acquires a document from the cloud platform server 102 and transmits a document transmission request with the document to the document transmission module 304. The document transmission module 304 transmits the transmitted document to a document generation server.

FIG. 4 is a block diagram illustrating a configuration of software modules that operate on the cloud platform server 102. A cloud platform service 302 includes these software modules. The software modules are stored in the HDD 204 illustrated in FIG. 2 and are loaded into the RAM 203 and executed by the CPU 201 as described above.

A transmission/reception unit 401 processes communication with the web browser 301 of the client apparatus 101 and the web server 303 of the document generation server 103. A control unit 402 performs processing according to a received request. A page generation unit 403 generates a web page to be returned to the web browser 301. An authentication unit 405 authenticates a user having made a request to log into the cloud platform service 302. A session management unit 404 manages session information of a user having been successfully authenticated by the authentication unit 405. A data management unit 406 holds documents in a database (DB) 408 and acquires a document from the DB 408 or updates a document in the DB 408 according to a request. A setting management unit 407 holds settings for redirecting to the document generation server 103. The cloud platform service 302 performs processing described below through the cooperation of these components.

Further, the DB 408 stores management user data and documents and is stored in the HDD 204 illustrated in FIG. 2. The management user data and the documents are managed for each company or organization (hereinafter referred to as "organization"). An organization identification (ID) is automatically assigned to the organization, and each piece of data is managed together with the organization ID. When a user is authenticated, the organization ID of the organization to which the user belongs is acquired and saved in the session management unit 404. The subsequent processing such as data acquisition is performed based on the organization ID, and only data that matches the organization ID can be referred to. Further, the DB 408 also stores settings for redirecting to the document generation server 103. The documents and the settings for redirecting to the document generation server 103 that are stored in the DB 408 are updated at any timing by a user (an administrator) through the web browser 301.

Figure 5:
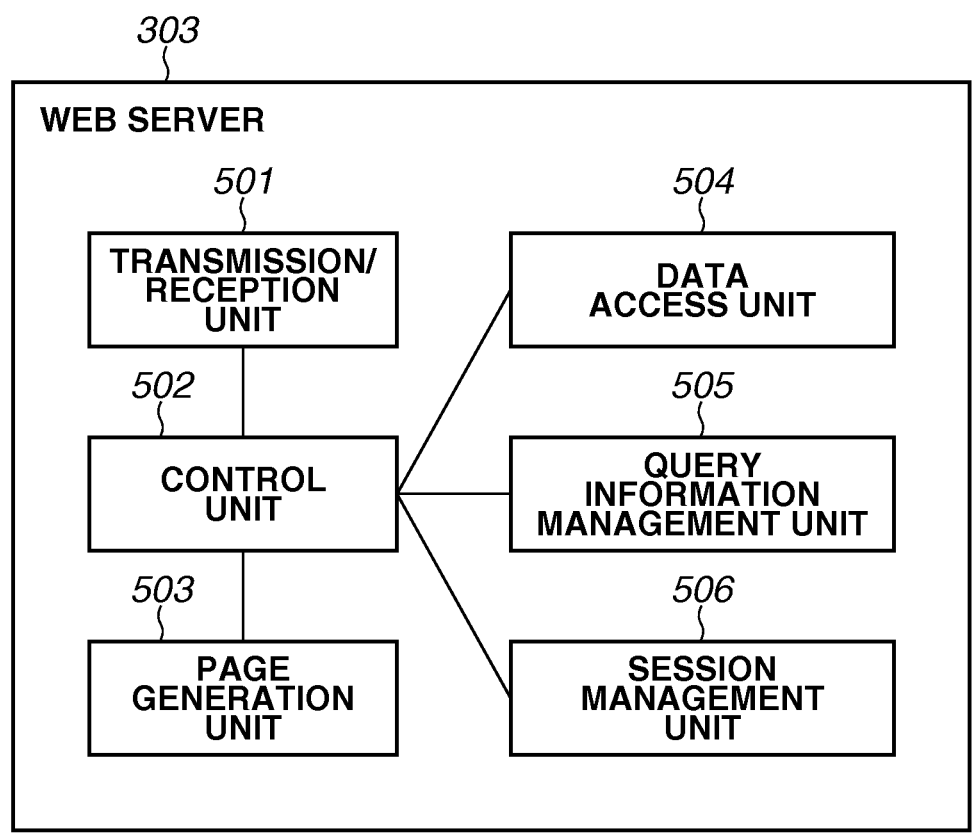
FIG. 5 is a block diagram illustrating a configuration of software modules of a web server 303.

FIG. 5 is a block diagram illustrating a configuration of software modules that operate on the web server 303 of the document generation server 103. The software modules are stored in the HDD 204 illustrated in FIG. 2, and are loaded into the RAM 203 and executed by the CPU 201 as described above. The web server 303 includes a transmission/reception unit 501, which processes communication with the web browser 301 of the client apparatus 101, the cloud platform service 302, and the document transmission module 304. The web server 303 further includes a control unit 502, which performs processing according to a received request, a page generation unit 503, which generates a web page to be returned to the web browser 301, and a data access unit 504, which acquires a document list or a document from the cloud platform service 302. The web server 303 further includes a query information management unit 505, which manages a query information table, and a session management unit 506, which manages session information of the web browser 301. The web server 303 performs processing described below through the cooperation of these components.

Figure 6:
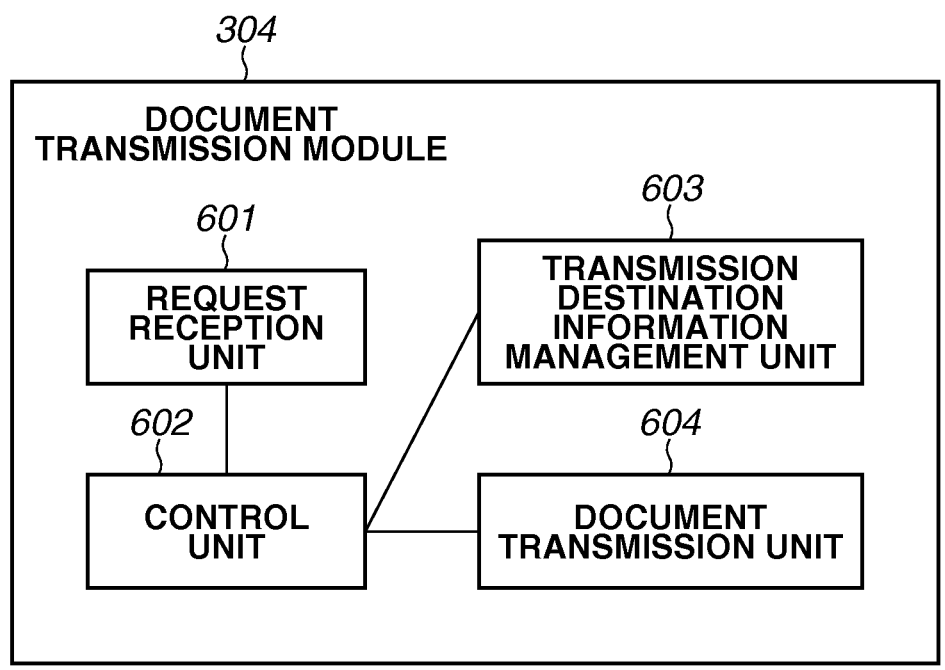
FIG. 6 is a block diagram illustrating a configuration of software modules of a document transmission module 304.

FIG. 6 is a block diagram illustrating a configuration of software modules that operate on the document transmission module 304 of the document generation server 103. The software modules are stored in the HDD 204 illustrated in FIG. 2, and are loaded into the RAM 203 and executed by the CPU 201 as described above. The document transmission module 304 includes a request reception unit 601, which receives a document transmission request from the web server 303, and a control unit 602, which performs processing according to a received request. The document transmission module 304 further includes a transmission destination information management unit 603, which manages transmission destination information, and a document transmission unit 604, which transmits a document transmitted from the web server 303 to a document generation server (not illustrated).

Figure 13:
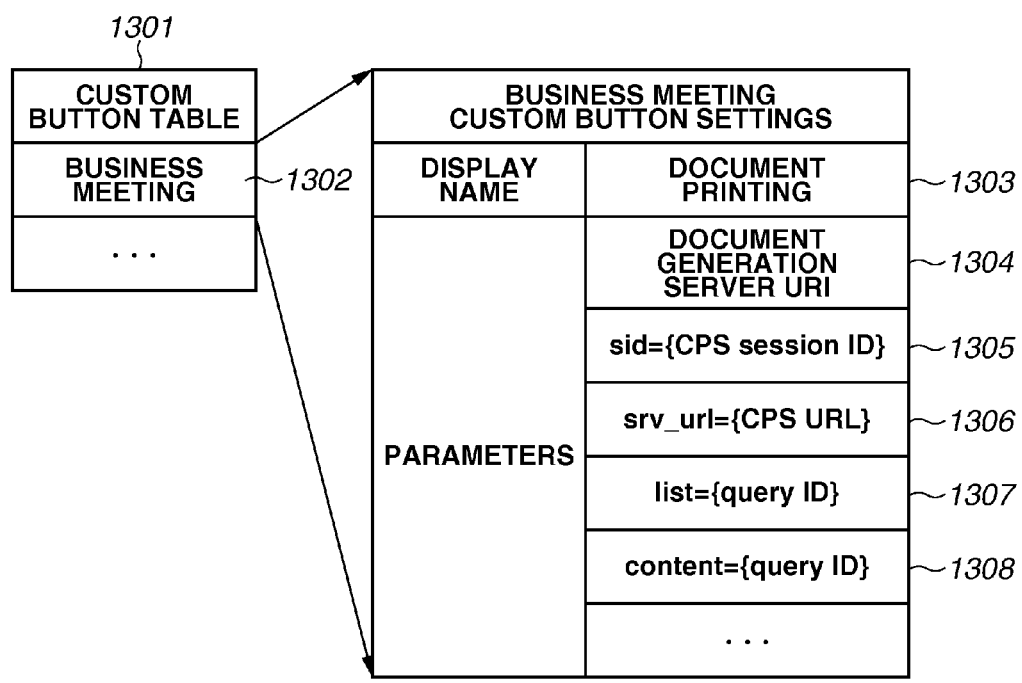
FIG. 13 is an example of definition information of a custom button in the cloud platform service.

FIG. 13 is a diagram illustrating an example of the settings for redirecting to the document generation server 103 that are held in the setting management unit 407 of the cloud platform service 302. In FIG. 13, a custom button is defined as a "business meeting" tab, and as setting information of the custom button displayed in the "business meeting" tab, a button display name 1303 and parameter information for redirecting to the document generation server 103 are stored.

A parameter 1304 is a document generation server uniform resource identifier (URI) 1304, which specifies the URI of the document generation server 103 in the form of "http:// . . . ". A parameter 1305 is a setting for acquiring the session ID of a user having logged in and adding the character string "sid=<session ID>" to a uniform resource locator (URL) parameter. A parameter 1306 is a setting for acquiring a URL that allows the document generation server 103 to access the cloud platform service 302 and adding the character string "srv_url=<cloud platform service URL>" to a URL parameter. The URL for accessing the cloud platform service 302 is unique for each organization. When a user is authenticated, the control unit 502 acquires a URL according to the organization to which the user belongs. Then, the control unit 502 saves the acquired URL in the session management unit 404. A parameter 1307 is a query ID 1307, which uniquely identifies query information for acquiring a document list from the cloud platform service 302. A parameter 1308 is a query ID 1308, which uniquely identifies query information for acquiring a document from the cloud platform service 302.

Figure 14:
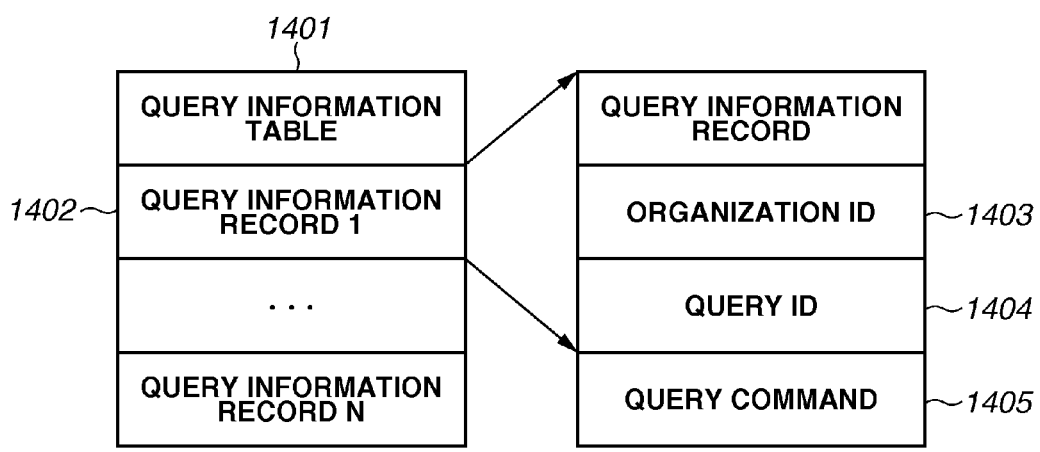
FIG. 14 is a diagram illustrating a table structure of a query information table.

FIG. 14 is a diagram illustrating a table structure of the query information table held by the query information management unit 505 of the web server 303. A query information record 1402 includes an organization ID 1403, which identifies the organization that is the owner of the record, a query ID 1404, which uniquely identifies the query information record 1402, and a query command 1405, which describes a query for acquiring a document list or a document from the cloud platform service 302.

Figure 7:
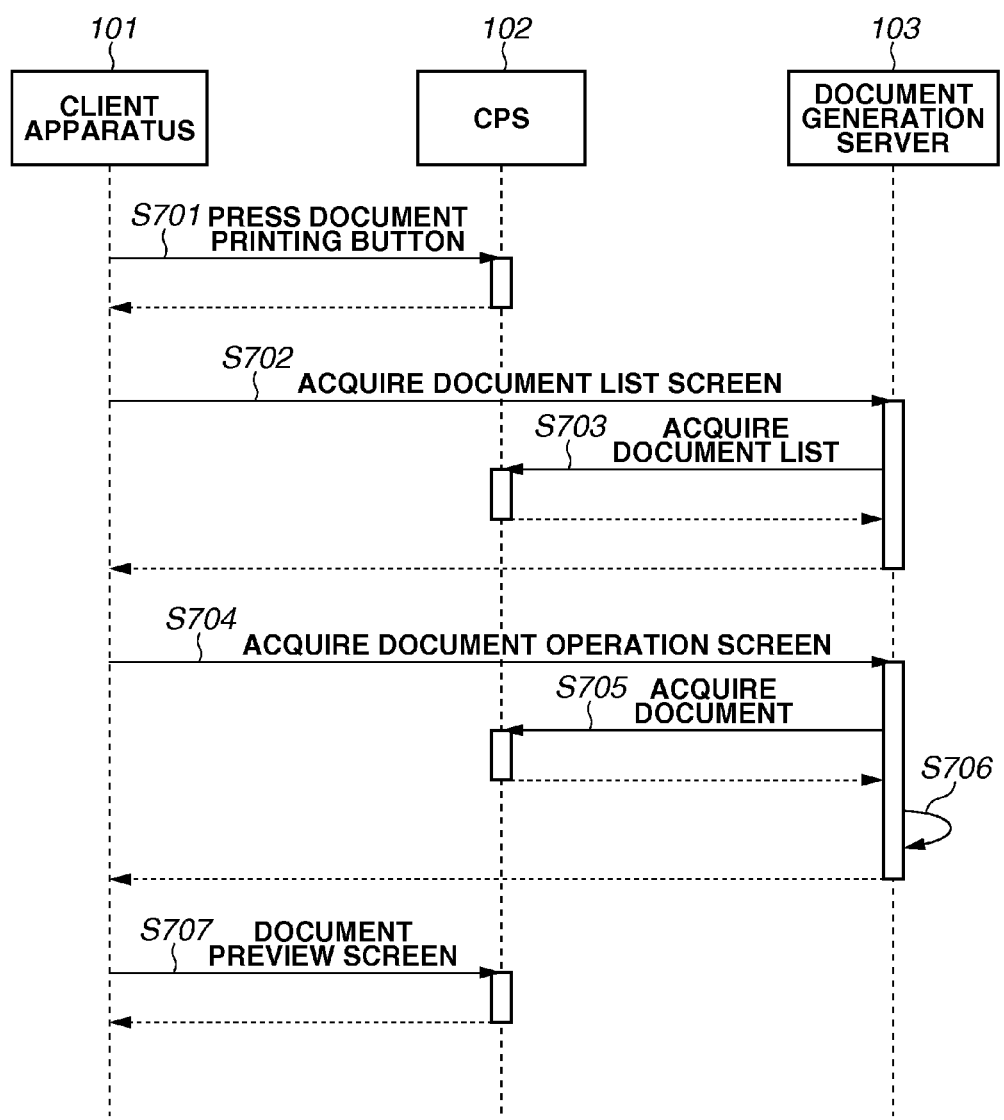
FIG. 7 is a sequence diagram illustrating a processing sequence performed by the document printing system according to a first exemplary embodiment of the present invention.

Next, with reference to drawings, a document preview using the document printing system according to the first exemplary embodiment of the present invention is described in detail. In the following figures, the cloud platform service is abbreviated as "CPS". FIG. 7 illustrates a flow of processing performed in the document printing system according to the first exemplary embodiment of the present invention. A user has already logged into the cloud platform service 302 through a login screen (not illustrated). Consequently, a screen of the cloud platform service 302 is displayed on the web browser 301, and a document printing button for which the settings in FIG. 13 have been made in advance is displayed on the screen.

First, in step S701, the user presses the document printing button on the screen displayed on the web browser 301 of the client apparatus 101. Then, the cloud platform service 302 creates a URL for redirecting to the document generation server 103 based on the settings in FIG. 13 and returns a response to the browser 301.

If the web browser 301 has received the response returned from the cloud platform service 302, then in step S702, the web browser 301 transmits the session ID ("sid=<session ID>") of the cloud platform service 302, the URL ("srv_url=<URL>") for accessing the cloud platform service 302, the document list acquisition query ID 1307 ("list=<query ID>"), and the document acquisition query ID 1308 ("content=<query ID>") to the web server 303 of the document generation server 103. If the web server 303 has received this request from the web browser 301, then in step S703, the web server 303 acquires a document list from the cloud platform service 302.

Figure 8:
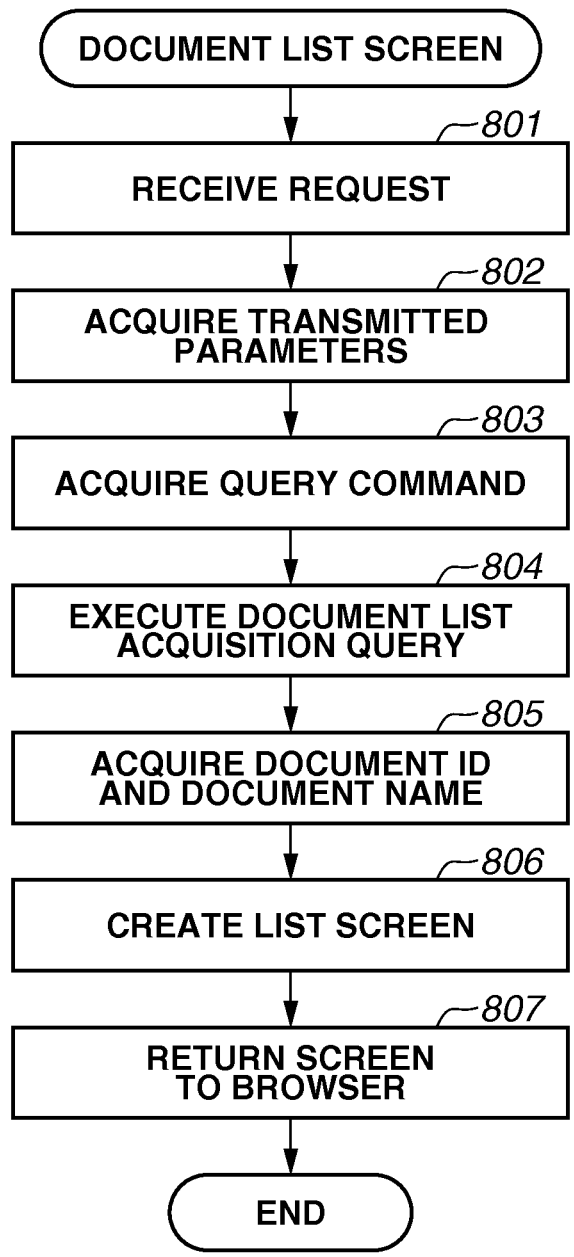
FIG. 8 is a flow chart illustrating a document list screen creation process according to the first exemplary embodiment.

FIG. 8 is a flow chart illustrating a document list screen creation process performed by the web server 303 in steps S702 and S703 in FIG. 7. In the present exemplary embodiment, the control unit 502 includes the CPU 201, the ROM 202, the RAM 203, and the HDD 204. The procedure illustrated in the flow chart is stored in any of these storage units, i.e., the ROM 202, the RAM 203, and the HDD 204, of the control unit 502 and is performed by the CPU 201.

In step S801, the control unit 502 receives the request from the web browser 301. In step S802, the control unit 502 acquires the session ID of the cloud platform service 302, the URL for accessing the cloud platform service 302, the document list acquisition query ID 1307 ("list=<query ID>"), and the document acquisition query ID 1308 ("content=<query ID>") from the transmitted parameters and stores the acquired information in the RAM 203. Further, the control unit 502 saves the session ID of the cloud platform service 302, the URL for accessing the cloud platform service 302, and the document acquisition query ID 1308 in the session management unit 506.

Next, in step S803, the control unit 502 searches the query information table and acquires the query information record 1402 having the query ID 1404 that matches the document list acquisition query ID 1307 in the transmitted parameters. Next, in step S804, the control unit 502 connects to the cloud platform service 302 using the session ID of the cloud platform service 302 and the URL for accessing the cloud platform service 302 that have been stored in the RAM 203 in step S802. Then, the control unit 502 executes the query command 1405 of the acquired query information record 1402. Next, in step S805, the control unit 502 acquires a document ID (Id) and a document name (Title) from the results of execution of the query command 1405. Then, in steps S806 and S807, the control unit 502 requests the page generation unit 503 to generate a document list screen 1001 and returns the generated document list screen 1001 to the web browser 301. Through the above processing, the web server 303 performs the document list screen creation process. If the document list acquisition query ID 1307 in the transmitted parameters does not exist in the query information table in step S803, the control unit 502 can determine that an error has occurred. Further, if the number of acquired results of execution of the query command 1405 is 0 in step S805, the control unit 502 may determine that an error has occurred.

Figure 10:
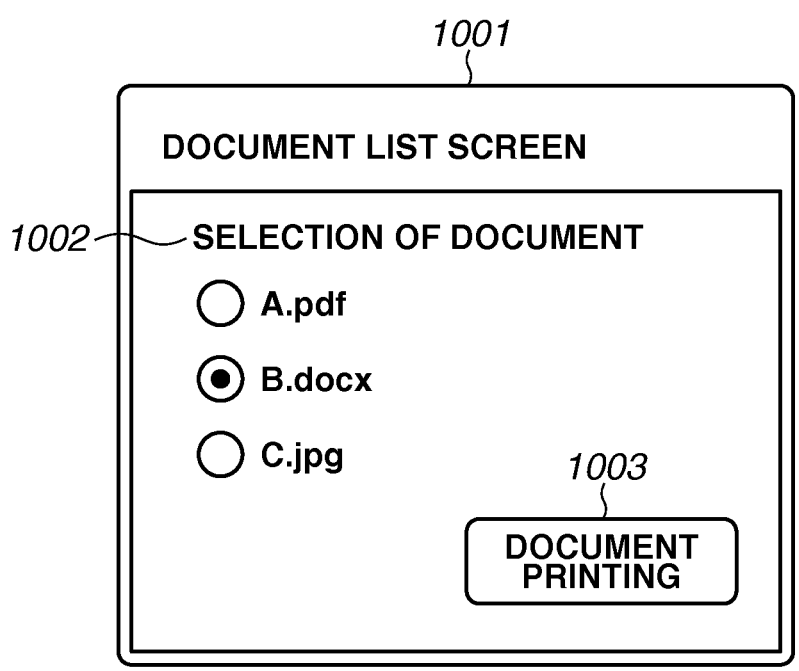
FIG. 10 is an example of a document list screen.

FIG. 10 illustrates an example of the document list screen 1001 generated in step S806. The file name of a document saved in the cloud platform service 302 is displayed, and a document printing button 1003, which allows the user to select a document and give an instruction to print the document, is also displayed.

Referring to FIG. 7, the user selects a document and presses the document printing button 1003 on the document list screen 1001 returned to the web browser 301. In response to this operation, in step S704, the web browser 301 transmits a document operation screen acquisition request with the Id of the selected document to the web server 303. If the web server 303 has received the document operation screen acquisition request in step S704, the web server 303 performs a document acquisition process.

Figure 9:
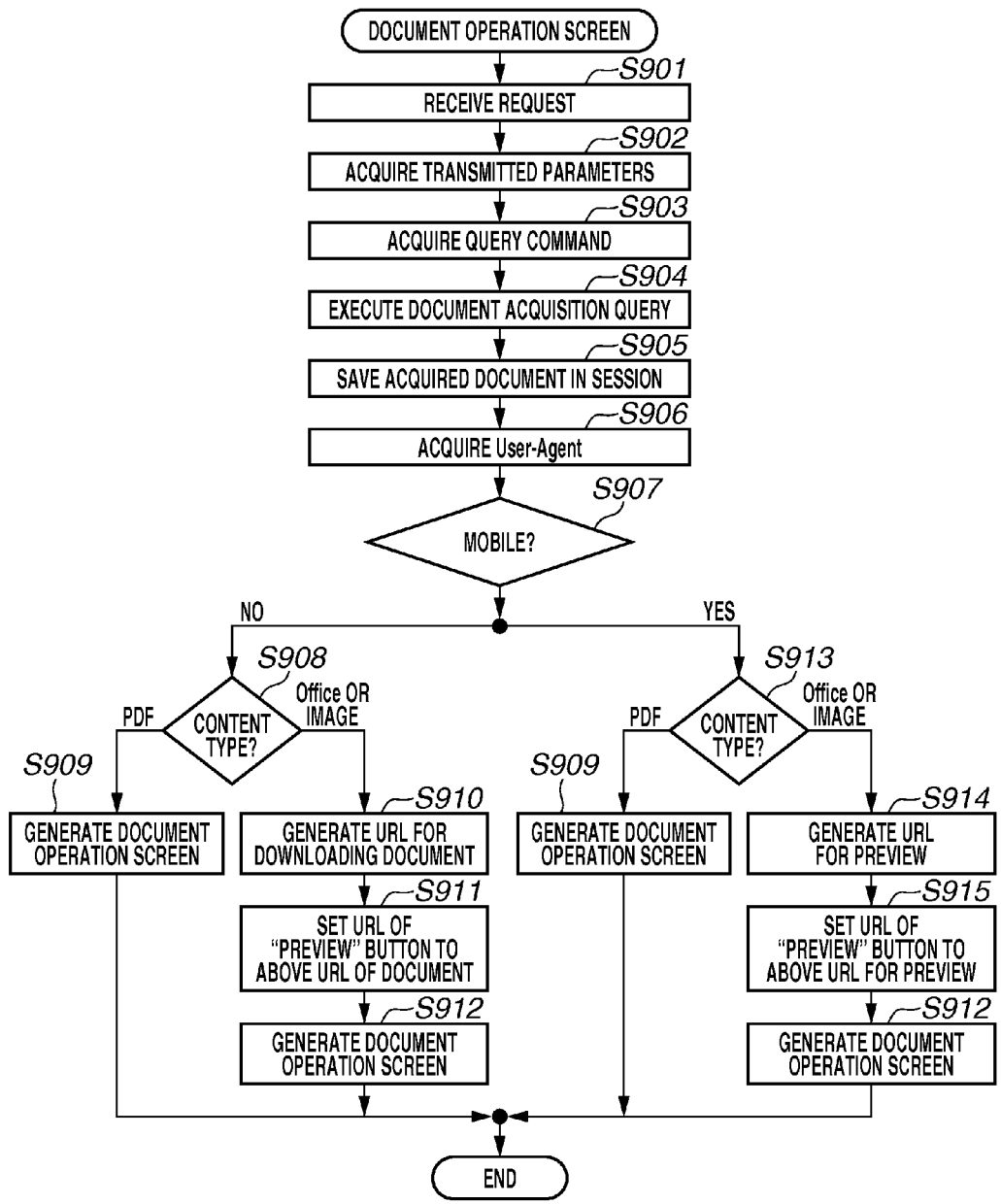
FIG. 9 is a flow chart illustrating a document operation screen creation process according to the first exemplary embodiment.

FIG. 9 is a flow chart illustrating a document operation screen creation process performed by the web server 303 in steps S704 to S706 in FIG. 7. In the present exemplary embodiment, the control unit 502 includes the CPU 201, the ROM 202, the RAM 203, and the HDD 204. The procedure illustrated in the flow chart is stored in any of these storage units, i.e., the ROM 202, the RAM 203, and the HDD 204, of the control unit 502 and is performed by the CPU 201.

In step S901, the control unit 502 receives the request from the web browser 301. In step S902, the control unit 502 acquires the Id of the selected document from the transmitted parameters and stores the acquired Id in the RAM 203. Further, the control unit 502 acquires the session ID of the cloud platform service 302, the URL for accessing the cloud platform service 302, and the document acquisition query ID 1308 from the session management unit 506. Next, in step S903, the control unit 502 searches the query information table and acquires the query information record 1402 having the query ID 1404 that matches the acquired document acquisition query ID 1308. Then, the control unit 502 creates a document acquisition query based on the query command 1405 of the acquired query information record 1402 and the acquired Id of the selected document. Next, in step S904, the control unit 502 connects to the cloud platform service 302 using the session ID of the cloud platform service 302 and the URL for accessing the cloud platform service 302 that have been acquired in step S902. Then, the control unit 502 executes the created document acquisition query.

FIGS. 15A to 15C illustrate examples of the query command 1405 registered in the query information record 1402 of the query information table 1401 and an example of the created query. FIG. 15A illustrates an example of the query command 1405 for acquiring a document list. In this example, the query command 1405 is defined as acquiring a record ID (Id 1501), a document name (Title 1502), a content type (FileType 1503), and a file size (ContentSize 1504) from a ContentVersion table 1505. FIG. 15B illustrates an example of the query command 1405 for acquiring a document. In this example, the query command 1405 is defined as acquiring a record ID (Id 1505) and document data (VersionData 1506) from a ContentVersion table 1507. Further, "'Id'" indicates that its value is replaced by a value specified by the parameter Id during execution. FIG. 15C illustrates an example of the document acquisition query created in step S904 when the value of the parameter Id is "12345".

Next, in step S905, the control unit 502 saves the document acquired in step S904 in the session management unit 506. Then, in step S906, the control unit 502 acquires the User-Agent in the request header. In step S907, the control unit 502 determines whether the client environment is mobile. If it is determined that the client environment is not mobile (No in step S907), i.e., if it is determined that the environment of the client is not mobile and therefore the client can preview a predetermined type of data, then in step S908, the control unit 502 determines the content type of the acquired document. If it is determined in step S908 that the content type is an Office document or an image document, then in step S910, the control unit 502 generates a URL for downloading the document to the web browser 301. This URL is a URL for acquiring the document saved in step S905 from the session management unit 506 and returning the document to the web browser 301. This URL is a URL for acquiring a document acquired from the cloud platform service 302, which is a service of an external server, and saved in the session management unit 506, the URL including the URL of the session management unit 506. Then, in step S911, the control unit 502 specifies that the generated URL be set to the URL of a preview button. In step S912, the control unit 502 requests the page generation unit 503 to generate a document operation screen and returns the generated document operation screen to the web browser 301.

If it is determined that the content type is a Portable Document Format (PDF) document, then in step S909, the control unit 502 requests the page generation unit 503 to generate a document operation screen and returns the generated document operation screen to the web browser 301. The process of generating a document operation screen in step S909 is similar to the processes of steps S910 to S912 described above, except that in step S909, the document to be acquired is a PDF document. In either case, based on the determination that the environment of the client is not mobile, and therefore the client can preview the document regardless of the type of the document, the control unit 502 acquires the document from the CPS 102 and provides a document preview function from the document generation server 103 to the web browser 301.

If it is determined that the client environment is mobile (Yes in step S907), then in step S913, the control unit 502 determines the content type of the acquired document. If it is determined that the content type is a PDF document, then in step S909, the control unit 502 requests the page generation unit 503 to generate a document operation screen and returns the generated document operation screen to the web browser 301.

If it is determined in step S913 that the content type is an Office document or an image document, then in step S914, based on the determination that the environment of the client is mobile and therefore the client cannot preview the document, the control unit 502 generates a URL for accessing the page of the document on the cloud platform service 302. At this time, the control unit 502 generates a URL for accessing the page of the document on the cloud platform service 302 from the URL for accessing the cloud platform service 302 acquired in step S902 and the Id of the selected document stored in RAM 203. Then, in step S915, the control unit 502 specifies that the generated URL be set to the URL of a preview button. In step S912, the control unit 502 requests the page generation unit 503 to generate a document operation screen and returns the generated document operation screen to the web browser 301.

If the fully qualified domain name (FQDN) (which can be changed according to the organization to which the user belongs) of the URL for accessing the cloud platform service 302 is "na1.salesforse.com" and the Id of a Microsoft® Word document saved in the cloud platform 102 is "12345", the URL of the detailed page of the document is "https://na1.salesforse.com/12345". On the detailed page of the document, it is possible to display the document without downloading the document or confirm the owner and the update date and time of the file. If the web browser 301 has accessed the detailed page of the document "https://na1.salesforse.com/12345", the Microsoft® Word document is displayed so that the Microsoft® Word document can be previewed on the web browser 301. At this time, the document converted into the Flash format or the Portable Network Graphics (PNG) format by the cloud platform 102 is displayed on the web browser 301. An Office application does not need to have been installed in the client apparatus 101.

The URL for accessing the cloud platform service 302 acquired in step S902 is, for example, "https://na1.salesforse.com/services/Soap/u/19.0/<organization ID>". The FQDN and the portion "<organization ID>" of this URL can be changed according to the organization to which the user belongs.

In step S914, the control unit 502 extracts the portion "https://na1.salesforse.com/" from the character string of the URL acquired in step S902, and generates a character string by connecting the Id (identification information) of the selected document stored in the RAM 203 to the end of the extracted character string. Then, the control unit 502 determines the generated character string as the URL for accessing the page of the document on the cloud platform service 302. This URL is set to the preview button on the generated document operation screen and thereby associated with the preview button. The URL is, for example, "<button type="button" onclick="window.open('https://na1.salesforse.com/12345')">preview</button>". Through the above processing, the web server 303 performs the document operation screen creation process.

Figure 11:
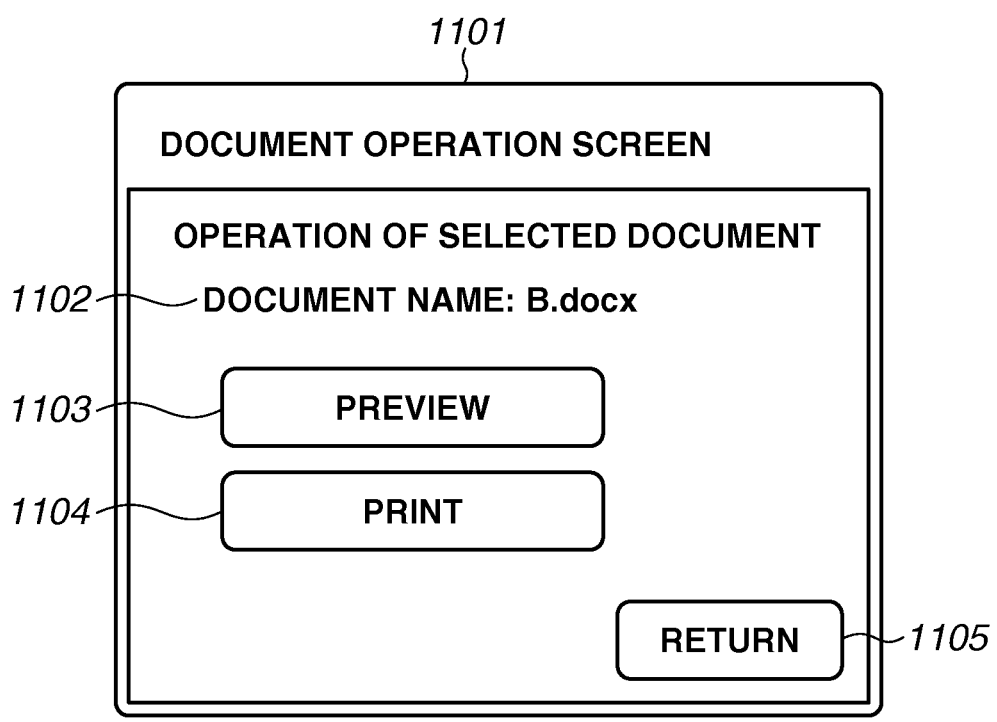
FIG. 11 is an example of a document operation screen.

FIG. 11 illustrates a document operation screen 1101, which is generated in step S912. The file name of the selected document is displayed. Further, a preview button 1103, which is an example of a preview instruction unit for previewing the document, a print button 1104, which is used to give an instruction to print the document, and a return button 1105, which is used to return to the document list screen 1001, are displayed. Although the operation screen has been discussed using a document as an example, the present invention is not limited to a document but deals with data in general. Thus, the operation screen is an operation screen super ordinate to what is termed a "data operation screen".

Referring to FIG. 7, the user presses the preview button 1103 on the document operation screen 1101 returned to the web browser 301. In response to this operation, if the client environment is mobile and the selected document is an Office document or an image document, then in step S707, the web browser 301 accesses the page of the document on the cloud platform service 302 and displays a preview of the document.

As described above, in the present exemplary embodiment, when the client environment is mobile and the selected document is an Office document or an image document and if the preview button 1103 is pressed, the web browser 301 accesses the page of the document on the cloud platform service 302, and then displays a preview of the document. In other cases, the web browser 301 downloads the document to the web browser 301 and displays a preview of the document. Through above operation, it is possible to display a preview of an Office document or an image document without the document generation server 102 converting the document for displaying a preview, regardless of the client environment.

In the present exemplary embodiment, if the environment is not mobile and an Office document or an image document is previewed, the document generation server 103 acquires the document from the CPS 102. Alternatively, the web browser 301 can access a page of the cloud platform service 302 and display a preview of the document without downloading the document. For example, if the file size of the document is a certain size or larger, the web browser 301 may access a page of the cloud platform service 302 and display a preview of the document. Further, in the case of an Office document, the web browser 301 may access a page of the cloud platform service 302 and display a preview of the document, regardless of whether the environment is mobile.

Next, with reference to the drawings, a second exemplary embodiment of the present invention is described. The portions similar to those of the first exemplary embodiment are not described, and only different portions are described below. After the document operation screen has been displayed on the web browser 301, the user may return the screen to the document list screen and reselect another document. In the first exemplary embodiment, if the user has selected a document on the document list screen and pressed the document printing button, the document generation server acquires the selected document from the cloud platform service, and then displays the document operation screen. The reason for this is to prevent the transmission of a document that cannot be printed by the document generation server to the document generation server. For example, the document generation server cannot print a PDF document to which a password is added. Thus, the document generation server analyzes a PDF document, and if a password is not added to the PDF document, the document generation server displays the print button on the document operation screen. To acquire the document, an application programming interface (API) of the cloud platform service is used. A cloud generally has governor limits, which limit the number of API calls, for example. The present exemplary embodiment is directed to, after the document operation screen has been displayed and even if the document operation screen returns to the document list screen to select another document, reducing the number of API calls to be consumed to as few as possible.

FIG. 16 is a flow chart illustrating a document list screen creation process performed by the web server 303 according to the second exemplary embodiment. In the flow, the steps similar to those in FIG. 8 are designated by the same numerals, and only different steps are described below. In step S1601, the control unit 502 acquires a document ID (Id), a document name (Title), and a content type (FileType) from the results of execution of the query command 1405 in step S804. Then, the control unit 502 requests the page generation unit 503 to generate a document list screen 1001 and returns the generated document list screen 1001 to the web browser 301. Through the above processing, the web server 303 performs the document list screen creation process. The second exemplary embodiment is different from the first exemplary embodiment in that the document generation server 103 does not acquire the document from the CPS 102.

Figure 12:
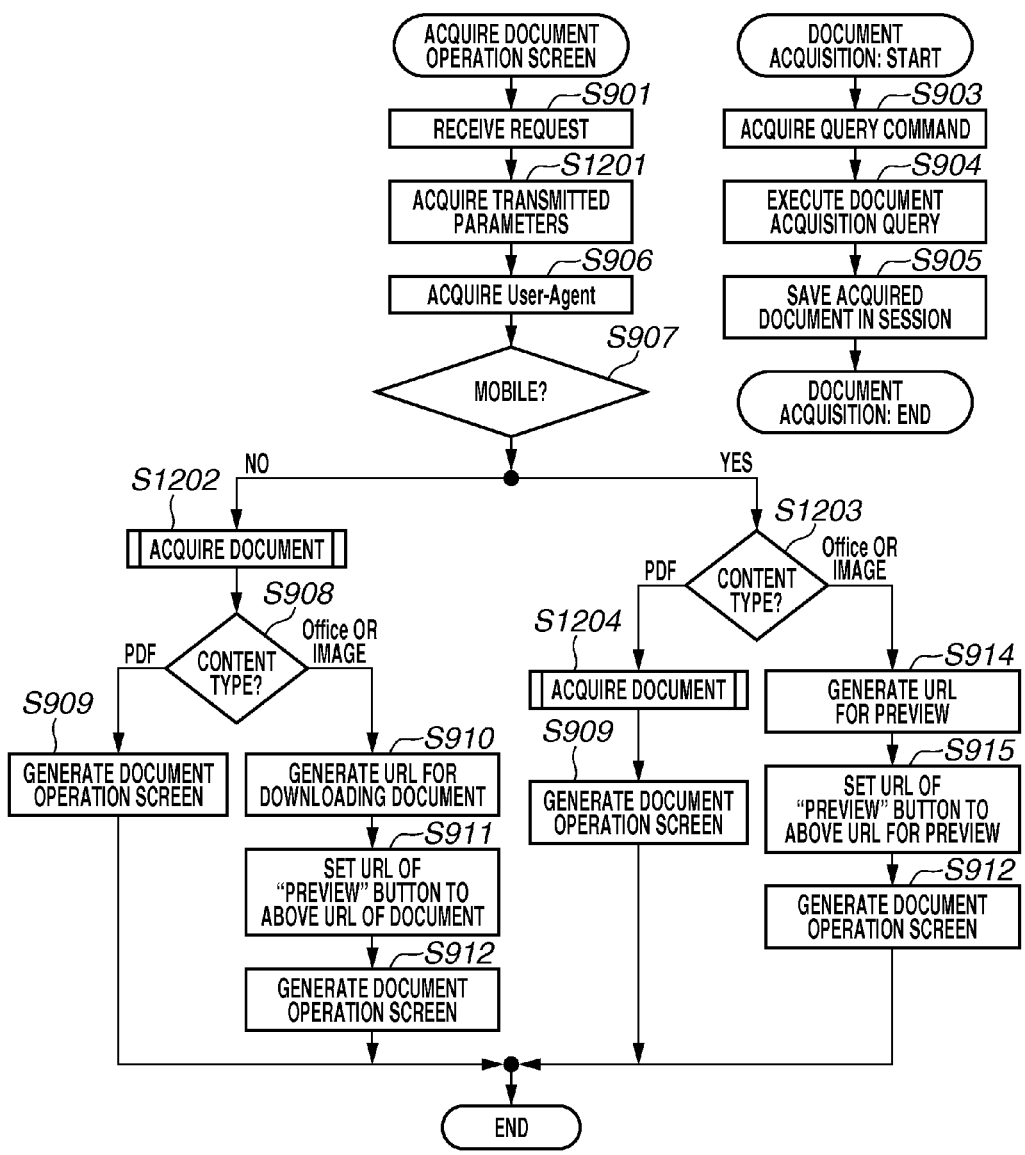
FIG. 12 is a flow chart illustrating a document operation screen creation process according to a second exemplary embodiment of the present invention.

FIG. 12 is a flow chart illustrating a document operation screen creation process performed by the web server 303 of the document generation server 103 according to the second exemplary embodiment. In the flow, the steps similar to those in FIG. 9 are designated by the same numerals, and only different steps are described below. In step S901, the control unit 502 receives the request from the web browser 301. Then, in step S1201, the control unit 502 acquires the Id and the FileType of the selected document from the transmitted parameters, and stores the acquired Id and FileType in the RAM 203. If it is determined in step S907 that the client environment is not mobile (No in step S907), then in step S1202, the control unit 502 acquires the document. If it is determined in step S907 that the client environment is mobile (Yes in step S907), then in step S1203, the control unit 502 acquires the content type (FileType) stored in the RAM 203 and determines the acquired content type. In other words, if it is determined that the client environment is mobile, the control unit 502 does not acquire the document.

If it is determined in step S1203 that the content type is a PDF document, then in step S1204, the control unit 502 acquires the document. If it is determined in step S1203 that the content type is an Office document or an image document, the control unit 502 does not acquire the document. According to the second exemplary embodiment, if the client environment is mobile and the selected document is an Office document or an image document, the control unit 502 skips the acquisition of the document and displays the document operation screen 1101. If the user has pressed the preview button 1103, the web browser 301 accesses the page of the document on the cloud platform service 302 and displays a preview of the document. When the user has pressed the print button 1104, the Office document or the image document is acquired.

Based on the above processing, according to the client environment and the content type of the document, it is possible to switch the timing of acquiring the document. When an Office document or an image document is previewed in a mobile environment, the document is not acquired. Then, when the document is printed, the document is acquired. This prevents the unnecessary consumption of the number of API calls of the cloud platform service.

Next, with reference to the drawings, a third exemplary embodiment according to the present invention is described. The portions similar to those of the first and second exemplary embodiments are not described, and only different portions therefrom are described below.

The function of displaying a preview on a page of the cloud platform service has a limit of the previewable file size. When the document size exceeds a limit and if the page of the document on the cloud platform service has been accessed, the document cannot be previewed (a screen including a message notifying a user that the document cannot be previewed is displayed). The present exemplary embodiment is directed to, if the document size is large, preventing access to a page of the cloud platform service.

FIG. 17 is a flow chart illustrating a document list screen creation process performed by the web server 303 according to the third exemplary embodiment. In the flow, the steps similar to those illustrated in FIG. 8 are designated by the same numerals, and only different steps are described below. In step S1701, the control unit 502 acquires a document ID (Id), a document name (Title), a content type (FileType), and a file size (ContentSize) from the results of execution of the query command 1405 in step S804. Then, the control unit 502 requests the page generation unit 503 to generate a document list screen 1001 and returns the generated document list screen 1001 to the web browser 301. Through the above processing, the web server 303 performs the document list screen creation process.

FIG. 18 is a flow chart illustrating a document operation screen creation process performed by the web server 303 of the document generation server 103 according to the third exemplary embodiment. In the flow, the steps similar to those illustrated in FIGS. 9 and 12 are designated by the same numerals, and only different steps are described below. If it is determined in step S1203 that the content type is an Office document or an image document, then in step S1801, the control unit 502 acquires size information of the selected document from the parameters transmitted in response to the request. Next, in step S1802, based on the acquired size information, the control unit 502 determines whether the size of the document is smaller than or equal to a threshold. The control unit 502 acquires the threshold from a preview setting management unit (not illustrated) of the document generation server 102. The threshold is smaller than or equal to the upper limit of the previewable document size on a page of the cloud platform service 302.

If it is determined in step S1802 that the acquired size of the document exceeds the threshold (No in step S1802), then in step S1803, the control unit 502 specifies that the preview button is disabled. Then, the control unit 502 requests the page generation unit 503 to generate a document operation screen. In step S1803, instead of disabling the preview button, the control unit 502 can, for example, display a message on the document operation screen to notify the user that the document cannot be previewed. According to the third exemplary embodiment, when the client environment is mobile and the selected document is an Office document or an image document and if the size of the selected document exceeds a threshold, the control unit 502 displays the document operation screen 1101 on which the preview button is disabled. Through the above processing, if the document size is large, the web browser 301 does not access a page of the cloud platform service 302.

In the present exemplary embodiment, if the size of a document exceeds a threshold, it is not allowed to preview the document. Alternatively, even when the size of a document exceeds a threshold, if the content type is an image document, the document operation screen on which the preview button is abled may be displayed. If the preview button is pressed at this time, the image document may be downloaded to the web browser 301. In this case, if it is determined in step S1802 that the size of the document exceeds the threshold, the control unit 502 acquires the content type stored in the RAM 203. Then, if the content type is an image document, the control unit 502 acquires the document. Next, the control unit 502 generates a URL for downloading the acquired document to the web browser 301. Then, the control unit 502 specifies that the generated URL is set to the URL of the preview button. Then, the control unit 502 requests the page generation unit 503 to generate a document operation screen.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-012801 filed Jan. 27, 2014, which is hereby incorporated by reference herein in its entirety.

What is claimed is:

1. A server system having a service for performing predetermined processing on data acquired from an external server, wherein the service provides a client with a function of displaying a preview of the data as a function in the service, the server system comprising:
    a determination unit configured to determine a type of the data to be subjected to the predetermined processing by the service;
    a setting unit configured to set, in a case where it is determined, based on the type of the data determined by the determination unit, that the client can preview the data, a uniform resource locator (URL) of a specific save location in the server system in which the data acquired from the external server is saved, and configured to set, in a case where it is determined, based on the type of the data determined by the determination unit, that the client cannot preview the data, a URL that allows a preview of the data and includes a URL of the external server; and
    a transmission unit configured to transmit, to the client, a data operation screen on which the URL has been set by the setting unit for a preview instruction unit that can receive an instruction to preview the data.

2. The server system according to claim 1,
    wherein the determination unit further determines an environment of the client,
    wherein, when it is determined, based on the environment of the client determined by the determination unit, that the environment does not allow the client to preview a predetermined type of data and in a case where it is determined, based on the type of the data determined by the determination unit, that the client can preview the data, the setting unit further sets the URL of the specific save location in the server system in which the data acquired from the external server is saved and,
    wherein, in a case where it is determined, based on the type of the data determined by the determination unit, that the client cannot preview the data, the setting unit further sets the URL that allows a preview of the data and includes the URL of the external server.

3. The server system according to claim 2, wherein, in a case where it is determined, based on the environment of the client determined by the determination unit, that the environment allows the client to preview the predetermined type of data, the setting unit sets the URL of the specific save location in the server system in which the data acquired from the external server is saved, regardless of the type of the data.

4. The server system according to claim 2, further comprising an acquisition unit configured to acquire the data from the external server, wherein the acquisition unit does not acquire the data from the external server until the environment of the client is determined, and
    wherein, in a case where it is determined, based on the environment of the client determined by the determination unit, that the environment allows the client to preview the predetermined type of data, or in a case where it is determined, based on the environment of the client determined by the determination unit, that the environment does not allow the client to preview the predetermined type of data, but it is determined, based on the type of the data determined by the determination unit, that the client can preview the data, the acquisition unit acquires the data from the external server.

5. The server system according to claim 4,
    wherein, in a case where it is determined, based on the environment of the client determined by the determination unit, that the environment does not allow the client to preview the predetermined type of data, the acquisition unit does not acquire the data from the external server,
    wherein, in a case where it is determined, based on the type of the data determined by the determination unit, that the client cannot preview the data, the acquisition unit does not acquire the data from the external server,
    wherein the setting unit sets the URL consisting of the URL of the external server that allows a preview of the data.

6. The server system according to claim 2,
wherein the determination unit acquires, in a case where it is determined, based on the type of the data determined by the determination unit, that the client cannot preview the data, size information of the data from the external server, and determines, based on the acquired size information, whether a size of the data is smaller than or equal to a threshold, and
wherein, in a case where it is determined that the size of the data is smaller than or equal to the threshold, the transmission unit transmits, to the client, the data operation screen on which an instruction to preview the data cannot be given through the preview instruction unit, and
wherein, in a case where it is determined that the size of the data is not smaller than or equal to the threshold, the transmission unit transmits, to the client, a data operation screen on which the URL set by the setting unit is associated with a preview button for receiving an instruction to preview the data.

7. The server system according to claim 2, wherein the environment that does not allow the client to preview the predetermined type of data is a mobile environment, and the data that cannot be previewed by the client is an Office document.

8. The server system according to claim 1,
wherein, in a case where the determination unit has determined that the client cannot preview the data, the setting unit sets a URL of a detailed page on the external server by adding identification information for identifying the data to the URL of the external server,
wherein the URL of the detailed page is a URL of a service of the external server for previewing the data converted into a format that can be displayed on a web browser of the client.

9. A control method for controlling a server system having a service for performing predetermined processing on data acquired from an external server, wherein the service provides a client with a function of displaying a preview of the data as a function in the service, the control method comprising:

determining a type of the data to be subjected to the predetermined processing by the service;

setting, in a case where it is determined, based on the type of the data determined, that the client can preview the data, a uniform resource locator (URL) of a specific save location in the server system in which the data acquired from the external server is saved, and setting, in a case where it is determined, based on the type of the data determined, that the client cannot preview the data, a URL that allows a preview of the data and includes a URL of the external server; and transmitting, to the client, a data operation screen on which the URL has been set for a preview instruction unit that can receive an instruction to preview the data.

10. A non-transitory computer-readable storage medium storing a program that causes a server system to perform a control method for controlling the server system, wherein the server system includes a service for performing predetermined processing on data acquired from an external server, wherein the service provides a client with a function of displaying a preview of the data as a function in the service, the control method comprising:

determining a type of the data to be subjected to the predetermined processing by the service;

setting, in a case where it is determined, based on the type of the data determined, that the client can preview the data, a uniform resource locator (URL) of a specific save location in the server system in which the data acquired from the external server is saved, and setting, in a case where it is determined, based on the type of the data determined, that the client cannot preview the data, a URL that allows a preview of the data and includes a URL of the external server; and transmitting, to the client, a data operation screen on which the URL has been set for a preview instruction unit that can receive an instruction to preview the data.

* * * * *